United States Patent [19]

Harris et al.

[11] Patent Number: 4,809,065
[45] Date of Patent: Feb. 28, 1989

[54] INTERACTIVE SYSTEM AND RELATED METHOD FOR DISPLAYING DATA TO PRODUCE A THREE-DIMENSIONAL IMAGE OF AN OBJECT

[75] Inventors: Lowell D. Harris, Wildwood; Charles R. Smith, Libertyville, both of Ill.

[73] Assignee: Kabushiki Kaisha Toshiba, Kanagawa, Japan

[21] Appl. No.: 936,156

[22] Filed: Dec. 1, 1986

[51] Int. Cl.$^4$ ............................................. H04N 13/00
[52] U.S. Cl. ........................................ 358/88; 358/89; 364/522
[58] Field of Search ...................... 358/88, 903, 3, 89, 358/104, 91, 92; 364/522, 521; 340/720, 723, 729; 273/313

[56] References Cited

U.S. PATENT DOCUMENTS

| | | | |
|---|---|---|---|
| 3,493,290 | 2/1970 | Traub | 350/174 |
| 4,130,832 | 12/1978 | Sher | 358/89 |
| 4,190,856 | 2/1980 | Ricks | 358/88 |
| 4,472,737 | 9/1984 | Iwasaki | 358/88 |
| 4,558,359 | 12/1985 | Kuperman et al. | 364/522 X |
| 4,567,513 | 1/1986 | Imsand | 358/88 X |
| 4,600,200 | 7/1986 | Oka et al. | 364/522 X |
| 4,607,255 | 8/1986 | Fuchs | 358/89 X |

OTHER PUBLICATIONS

Pizer, Systems for 3D Display in Medical Imaging, 3/85.
Anderson et al., Three-Dimensional Viewing System for Tomographic Scan Interpretation, 11/82.
Pizer, Interactive Varifocal Mirror Display Based on a Standard Raster Graphics Systems, 5/82.
Harris et al., Display and Analysis of Tomographic Volumetric Images Utilizing a Varifocal Mirror, 1984.
Stover, Terminal Puts Three-Dimensional Graphics on Solid Ground, 7/28/81 at 150.
Fuchs et al., A Three-Dimensional Display for Medical Images from Slices, 1979.

Primary Examiner—James J. Groody
Assistant Examiner—Victor R. Kostak
Attorney, Agent, or Firm—Finnegan, Henderson, Farabow, Garrett & Dunner

[57] ABSTRACT

A system for displaying data to produce a three-dimensional image, and interactively modifying and transforming the data and the resultant image in response to user commands comprises control circuitry, a high-speed processor linked to the control circuitry, a memory linked to the control circuitry and to the high-speed processor, and a raster-based display linked to the control circuitry and to the memory. The control circuitry is programmed to transfer data from the memory to the high-speed processor, to control the high-speed processor in modifying and transforming the data in response to, and in accordance with, the user command to obtain transformed data representative of a plurality of two-dimensional rasters of pixels, to transfer the transformed data from the high-speed processor to the memory, and to control the raster-based display in displaying the transformed data.

13 Claims, 8 Drawing Sheets

INTERACTIVE SYSTEM AND RELATED METHOD FOR DISPLAYING DATA TO PRODUCE A THREE-DIMENSIONAL IMAGE OF AN OBJECT

BACKGROUND OF THE INVENTION

1. Field of the Invention

This invention relates generally to a system and related method for displaying data representative of a plurality of two-dimensional planes of samples of an attribute of an object to produce a three-dimensional image of the attribute, and more specifically to a system and related method for modifying that data and the resultant image rapidly and interactively in response to user commands.

2. Background Information

Figure 1:
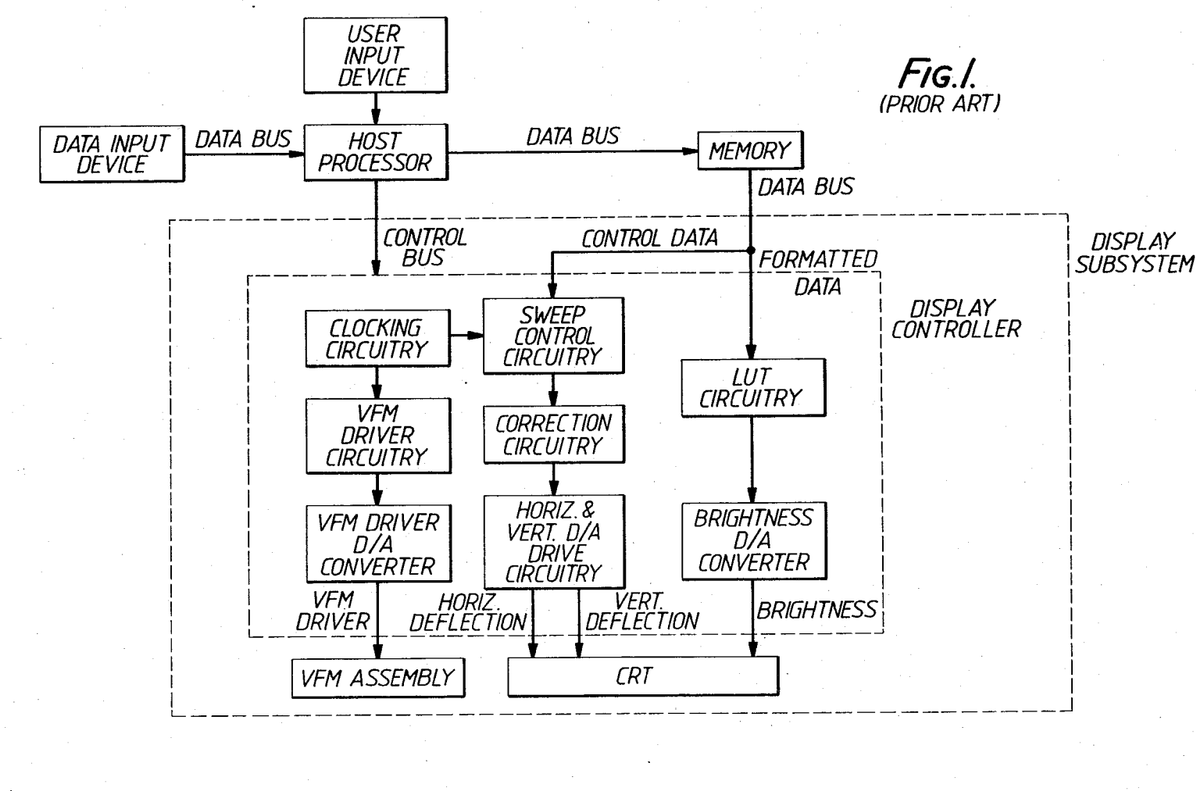
FIG. 1 is a block diagram of a prior art system.

As illustrated in FIG. 1, a prior art system for displaying data representative of a plurality of two-dimensional planes of samples of an attribute of an object to produce a three-dimensional image of the object typically includes a data input device, a user input device, a host processor, memory, and a raster-based display subsystem.

The raster-based display subsystem typically includes a vari-focal mirror ("VFM") assembly having a VFM driver input to a VFM mirror, a cathode-ray tube ("CRT") having horizontal deflection, vertical deflection, and brigtness inputs, and a display controller.

The display controller typically includes hardware look-up table ("LUT") circuitry, a brightness digital-to-analog ("D/A") converter, sweep control circuitry, correction circuitry, horizontal and vertical deflection D/A converters, clocking circuitry, VFM driver circuitry, and a VFM driver D/A converter.

The system further comprises a data bus linking the data input device to the host processor, a data bus linking the host processor to the memory, a data bus linking thememory to the LUT circuitry and to the sweep control circuitry, and a control bus linking the host processor to the display controller.

The raster-based display subsystem further comprises a brightness control line linking the brightness D/A converter to the brightness input of the CRT, a horizontal deflection control line linking the horizontal deflection D/A converter to the horizontal deflection input of the CRT, a vertical deflection control line linking the vertical deflection D/A converter to the vertical deflection input of the CRT, and a VFM driver control line linking the VFM D/A converter to the VFM driver input of the VFM assembly.

The user input device is typically linked directly to the host processor. Within the display controller, the LUT circuitry is typically linked to the brightness D/A converter; the sweep control circuitry is typically linked to the correction circuitry which in turn is linked to the horizontal and vertical D/A converters; the clocking circuitry is typically linked to the sweep control circuitry and to the VFM driver circuitry; and the VFM driver circuitry is typically liked to the VFM driver D/A converter.

In the prior art system, the host processor typically receives input data representative of equally-spaced two-dimensional planes of samples ("sample planes") of an attribute of an object from the data input device, and formats that data to obtain an image file comprised of image data also representative of the sample planes. Each image datum corresponds to a location within the object, and is comprised of sample magnitude bits having a value determined by the sample of the attribute of the object at that location, and transformation control bits to be used by the LUT circuitry of the display controller to transform the sample magnitude bits in a subsequent displaying step.

Figure 2:
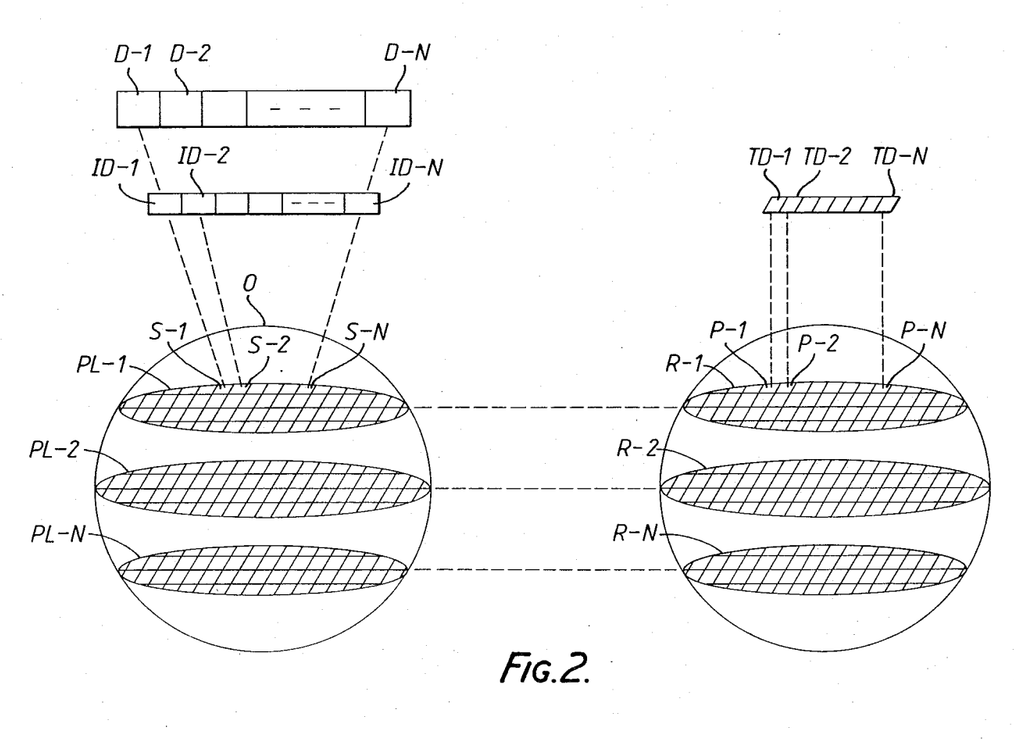
FIG. 2 illustrates the data structue of the prior art system.

The LUT circuitry transforms theimage data to obtain transformed data representative of a plurality of two-dimensional rasters of picture elements ("pixel rasters") of a volume of pixels ("pixel volume"). Each transformed datum corresponds to a location within the object and is comprised of brightness magnitude bits having a value determinative of the brightness of the resultant image of the attribute at that location within the image. For example, with respect to FIG. 2, input datum ID-1, ID-2, ... ID-N representative of equally-spaced two-dimensional planes PL-1, PL-2 ... PL-N of samples S-1, S-2 ... S-N of an attribute of an object O is formatted by the host processor to obtain image datum D-1, D-2 ... D-N also representative of the sample planes. Image datum D-1, D-2 ... D-N are transformed to obtain transformed datum TD-1, TD-2 . . . TD-N representative of a plurality of two-dimensional rasters R-1, R-2 ... R-N of pixels P-1, P-2 ... P-N of pixel volume V.

The host processor then computes control data for the image data defining the start of each sample plane and the start of each raster, and embeds the control data within the image data. The control data is used by the display subsystem to determine an appropriate time to begin displaying the image data repesentative of the plane. The display subsystem displays the image data of all planes within a display cycle comprised of intervals of time known as pixel intervals. The control data for a plane indicates the appropriate pixel interval within the display cycle to begin displaying the image data of the plane. The embedded control data is computed by the host processor so that successive two-dimensional images obtained by displaying image data representative of successive equally-spaced sample planes are also equally spaced.

The host processor stores image data in the memory, and signals the display controller that the data is available for displaying.

The display controller displays the image data by displaying one datum at a time. To display the image data of a sample plane, the display controller retrieves the data representative of the plane from memory, and begins displaying the data at the pixel interval within the display cycle indicated by the control data embedded within the data. The display controller displays each datum of the plane during a pixel interval. During the pixel interval, the LUT circuitry assigns a brightness magnitude value to theimage datum to obtain a transformed datum having that value in accordance with the value of the transformation control bits of that datum, and in some cases, the value of the sample magnitude bits of that datum. Simultaneously, the sweep control circuitry generates horizontal and vertical deflection datum, the values of which are modified by the correction circuitry to correct for anomalous perspective as described by L. D. Harris and J. J. Camp in *Display and Analysis of Tomographic Volumetric Images Utilizing a Vari-Focal Mirro*, Society of Photo-Optical Instrumentation Engineers (SPIE), Vol. 507—Processing and Display of Three—Dimensional Data II (1984), which is herein incorporated by reference.

The brightness magnitude value, and the modified horizontal and vertical deflection values are respectively converted to analog signals by the brightness, horizontal, and vertical deflection D/A converters and input to the brightness, horizontal, and vertical deflection inputs of the CRT, respectively.

Also during the pixel interval, and simultaneously with the display of the image datum, the VFM driver circuitry generates VFM driver datum which are in the form of a sampled sine-wave. The value of the VFM driver datum is converted to an analog signal by the VFM driver D/A converter, and input to the VFM driver input of the VFM mirror thereby causing the mirror to vibrate. The motion of the mirror is representative of a sinusoidal motion, and the mirror moves within the confines of a spherical cavity. The mirror completes one cycle during the time interval required to display all pixels of all the rasters.

The host processor tyically receives user commands from the user input device, and either modifies the transformation control bits of selected image datum in response to such commands to obtain a modified image datum. When the modified data is processed by the display controller, a modified three-dimensional image is produced. P Such modifications tyically take an inordinate amount of time for a prior art system to implement, which diminishes the user interactivity and hence the utility of such systems. For example, in medical imaging applications, the utility of such systems depends on the ability of the system to rapidly suppress the displaying of selected data in response to user commands and thereby slice or peel away selected portions of the resultant three-dimensional image to reveal portions of the image previously hidden by the peeled-away portions.

To improve user interactivity, the prior art host processor is typically programmed to form a file of image data, modify a copy of the file while the image data of the file is being displayed, form a file of modified image data, store the modified file in memory, and to thereafter signal the raster-based display subsystem to display the modified image data of the modified file.

Such an improvement is limited however by the architecture and software design of the prior art system, which does not allow rapid user interactivity in the case when the control or image datum must be modified. Instead, the architecture and software design of the system were chosen at the outset to achieve the more limited objective of displaying a three-dimensional image, a necessary first step in the development of an interactive system and a significant advance over the state of the art at the time.

For example, the prior art host processor is typically not efficient in rapidly modifying large amounts of data in response to user commands, must content with the raster-based display subsystem when accessing memory to respond to such commands, and is physically distant from such memory. In addition, the memory is typically only large enough to store two modified files of image data, thus, limiting the ability of a user to form a plurality of modified files, and to thereafter rapidly switch between displaying the data of the files in response to commands. Finally, embedding control data within the imagedata representative of a sample plane is inefficient, since the host processor cannot easily change the embedded data in response to user commands. Such architectural and design choices together contribute to the inordinate amount of time required by the prior art system to implement many user commands.

In a variation of the aforementioned prior art system, and also to improve interactivity, the input data is formatted to obtain image data representative of sample points instead of sample planes, and the display subsystem is a point-plotting display subsystem instead of a raster-based display subsystem.

Figure 3:
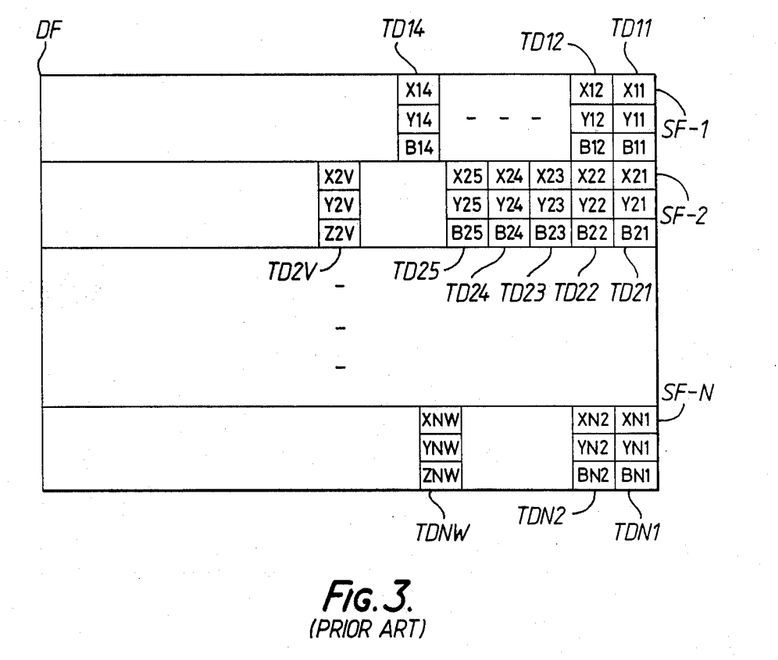
FIG. 3 illustrates the storing of data in a variant prior art system.

In the variant system, input data is formatted to obtain image data representative of a plurality of equally-spaced sample points within an object. Each image datum corresponds to a location within the object having horizontal, vertical, and depth components, and each is transformed to obtain a transformed datum corresponding to a location within the object comprised of brightness magnitude bits having a value determinative of the brightness of the resultant image of the object at that location within the image, and horizontal and vertical deflection bits having values determined by the horizontal and vertical components of the corresonding location within the object. The transformed datum is combined to form a file, and each transformed datum is stored within a subfile of the file according to the value of the depth component of the corresponding location within the object.

For example, with reference to FIG. 3, each transformed datum $TD11, TD12, TD21, \ldots TDNN$ within the file DF corresponds to a location within the object having horizontal, vertical, and depth components X, Y, and Z respectively. Furthermore, each transformed datum $TD11, TD12, TD21, \ldots TDNN$ is comprised of brightness magnitude bits $B11, B12, B21, \ldots BNN$ respectively having values determinative of the brightness of the resultant image at the corresponding location within the image, and is further comprised of horizontal and vertical deflection bits having values determined by the horizontal and vertical components $(X11, Y11), (X12, Y12), (X21, Y21), \ldots (XNN, YNN)$ of the corresponding locations within the objects. Each transformed datum $TD1U, TD2V \ldots TDNW$ is stored within a subfile of the file, $SF-1, SF-2 \ldots SF-N$ respectively, according to the value of the depth component, $Z1, Z2 \ldots ZN$ respectively of the corresponding location within the object. Thus, transformed datum corresponding to locations having depth components $Z1, Z2 \ldots ZN$ are stored within sufiles $SF-1, SF-2 \ldots SF-N$ respectively. The storage of such datum is described more fully by S. M. Pizer in *Interactive Varifocal Mirror Display Based on a Standard Raster-Graphics System*, The Institute for Graphic Communication (IGC) Conference on Three-Dimensional Display Techniques, Carmel, Ca. (May 16–18, 1982), which is herein incorporated by reference.

The point-plotting display subsystem of the variant prior art system displays the transformed data of a file structured as above in a different manner than the raster-based display subsystem of the prior art system. For example, the display controller of the variant prior art system begins displaying the transformed data of a subfile at a pixel interval within the display cycle indicated by the depth component of the subfile rather than as indicated by embedded control data. Also, the display controller of the variant prior art system obtains horizontal and vertical deflection data from the transformed data of a file rather tha from sweep control circuitry.

Such a variation improves user interactivity since the amount of data displayed during a display cycle of the variant prior art system is typically less than the amount of data displayed during a display cycle of the prior art system, and modification of the data in the variant system is thereby faster. However, the quality of the three-dimensional image produced by the variant prior art system is poorer, since less data is used to produce the image.

Accordingly, an object of the subject invention is to display data representative of a plurality of two-dimensional planes of samples of an attribute of an object to produce a high-quality three-dimensional image of that object, and to modify that data and the resultant image rapidly and interactively in response to user commands.

Additional objects and advantages of the invention will be set forth in the description which follows or may be learned by practice of the invention.

SUMMARY OF THE INVENTION

To achieve the foregoing objects, and in accordance with the purpose of the invention as embodied and broadly described herein, there is provided a system for selectively, interactively modifying and transforming image data of an object in response to user commands to generate transformed data to produce a selected high-quality three-dimesinal image of the object on a display comprising user input means for inputting the user commands; memory means for storing the image data and the transformed data; high-speed processing means coupled to the memory means for selectively transforming image data to produce transformed data; a raster-based display means coupled to the memory means for displaying transformed data; and control means coupled to the user input means, the memory means, the high-speed processing means, and the raster-based display means, for receiving and decoding the user commands from the input means and, in response to the decoded user commands, to control (1) the high-speed processing means in accessing certain image data stored in the memory means, in modifying the image data to produce modified image data, in transforming the accessed image data to produce transformed data corresponding to the selected high-quality three-dimensional image of the object, and in storing the transformed data in said memory means, and (2) the raster-based display means in displaying the transformed data stored in the memory means to display the selected high-quality three-dimensional image of the object.

A method of the subject invention includes the steps of (a) initializing a system comprising the substeps of receiving input data representative of equally-spaced two-dmensional planes of samples of an attribute of an object, formatting the input data to obtain image data also representative of the plurality of sample planes, wherein each image datum corresponds to a location within the object and is comprised of sample magnitude bits having a value determined by the sample of the attribute of the object at that location, and is comprised of transformation control bits, and setting up look-up tables in accordance with the user commands for use in a subsequent transforming step; (b) spatially compressing the image data at different degrees of compression to obtain singly compressed data, and doubly compressed data; (c) selecting the singly compressed data or the double compressed data in reponse to a user command to obtain selected image data; (d) modifying the values of the transformation control bits of the selected data in response to, and in accordance with, the user commands to obtain modified image data; (e) transforming the modified image data to obtain transformed data representing a plurality of two-dimensional rasters of pixels, the transforming step including the substeps of choosing for each modified image datum a look-up table according to the value of the transformation control bits of the datum, and transforming the value of the sample magnitude bits of the datum according to the chosen look-up table to obtain a brightness magnitude value of a transformed datum; (f) forming blocks of control data for the transformed data wherin each of the blocks corresponds to and defines two-dimensional raster of pixels represented by the transformed data, and wherein each control block comprises address data necessary to locate the transformed data representative of the corresponding raster, synchronization data indicative of the pixel interval to begin displaying the transformed data representative of the two coresponding two-dimensional raster, and deflection data necessary to correct for anomalous perspective; (g) displaying the transformed data according to the corresponding blocks of control data; and (h) storing the transformed data including the substeps of forming and storing a data file comprised of the transformed data, and forming a corresponding file comprised of the corresponding blocks of control data; and (i) interactively displaying transformed data of a selected file in accordance with the corresponding blocks of control data in response to a recevied user command.

DESCRIPTION OF THE PREFERRED EMBODIMENT

Figure 4:
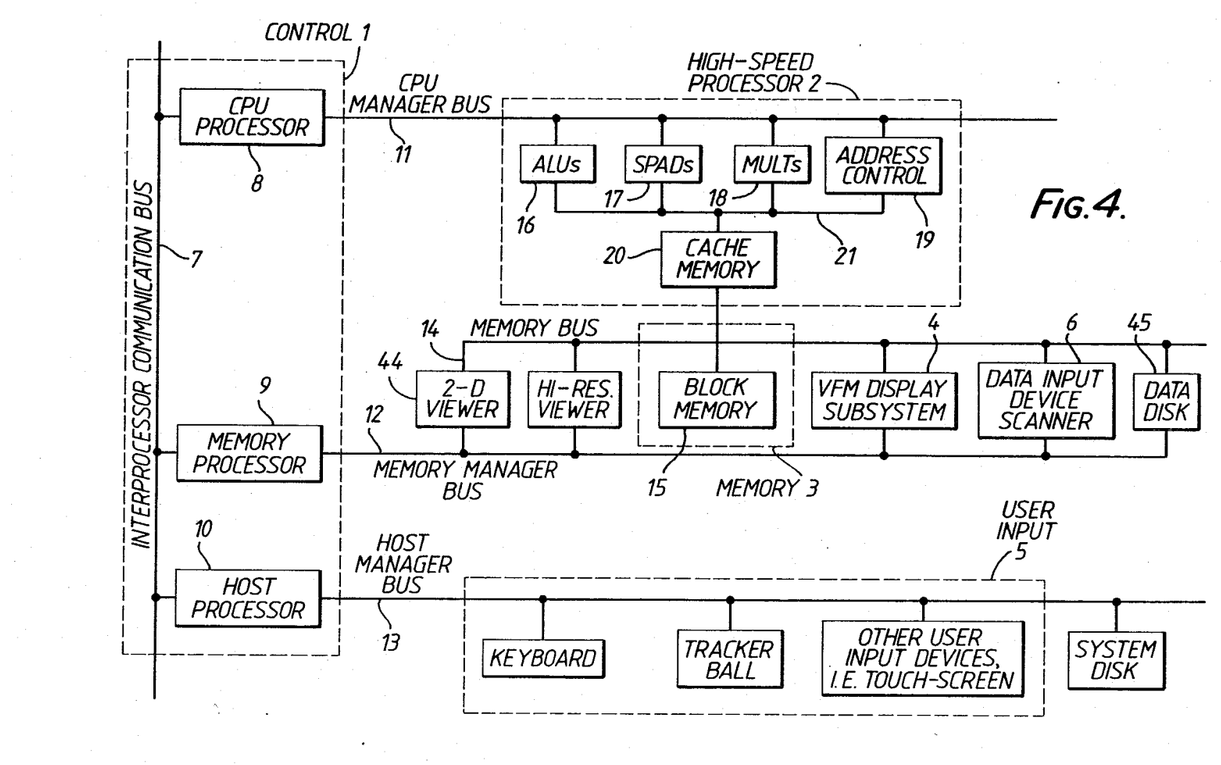
FIG. 4 is a block diagram of the system of the present invention.

A block diagram of a system incorporating the teachings of the subject invention is illustrated in FIG. 4. As shown in FIG. 4, the system preferably includes control means 1, high-speed processing means 2, memory means 3, raster-based VFM display means 4, user input means 5, and data input means 6, two-dimensional viewer 44, and data disk 45.

Control means 1 preferably includes an interprocessor communication bus 7, a CPU processor 8 linked to interprocessor communication bus 7, a memory processor 9 linked to bus 7, a host processor 10 linked to bus 7, a CPU manager bus 11 originating at CPU processor 8, a memory manager bus 12 originating at memory processor 9, and a host manager bus 13 originating at host processor 10.

Memory means 3 preferably includes a memory bus 14, and a block memory 15 linked to memory bus 14.

Data input device 6, two-dimensional viewer 44, and data disk 45 are preferably linked to memory bus 14 and to memory manager bus 12 and user input device 5 is preferably linked to host manager bus 13.

High-speed processing means 2 preferably includes a plurality of arithmetic logic units 16 ("ALUs"), a plurality of scratch-pad memories 17 ("SPADs"), a plurality of multipliers 18 ("MULTs"), address control means 19, a cache memory 20, and an internal bus 21 to which all of the above are preferably linked.

In addition, ALUs 16, SPADs 17, MULTs 18, and address control means 19 are preferably linked to CPU manager bus 11 and cache memory 20 is preferably linked to memory bus 14.

Figure 5:
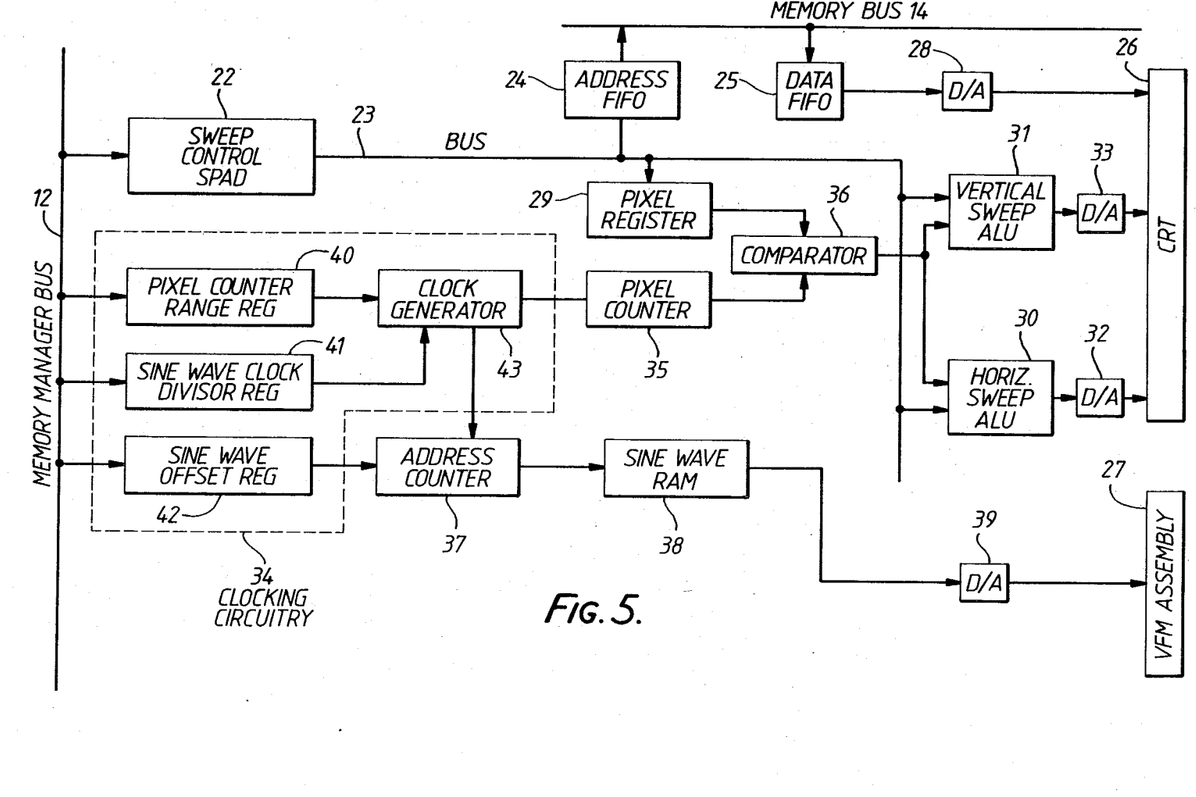
FIG. 5 is a block diagram of the VFM display subsystem of the system of the present invention.

A block diagram of raster-based display means 4 is illustrated in FIG. 5. As shown in FIG. 5, raster-based display means 4 preferably includes a sweep control scratch-pad memory ("SPAD") 22, an internal bus 23 originating from the SPAD 22, an address first-in-first-out ("FIFO") buffer 24 linked to internal bus 23 and to memory bus 14, a data FIFO buffer 25 linked to memory bus 14, a CRT 26 having brightness, horizontal defelction, and vertical deflection inputs, a D/A converter 28 linked to data FIFO buffer 25 and to the brightness input of CRT 26, a pixel register 29 linked to internal bus 23, a horizontal sweep ALU 30 linked to internal bus 23, a vertical sweep ALU 31 linked to internal bus 23, a D/A converter 32 linked to horizontal sweep ALU 30 and to the horizontal deflection input of CRT 26, a D/A converter 33 linked to vertical sweep ALU 31 and to the vertical deflection input of CRT 26, and clocking circuitry 34. Clocking circuitry 34 preferably includes a pixel counter range register 40 linked to memory manager bus 12, a clock generator 43 linked to pixel counter range register 40, a sine-wave clock divisor register 41 linked to memory manager bus 12 and to clock generator 43, and a sine-wave offset register 42 linked to memory manager bus 12 and address counter 37.

Raster-based display means 4 further preferably includes a pixel counter 35 linked to clock generator 43, a comparator 36 linked to pixel counter 35, to horizontal sweel ALU 30, and to vertical sweep ALU 31, address counter 37 linked to sine-wave offset register 42 and to clock generator 43, a sine-wave rapid-access memory ("RAM") 38 linked to address counter 37, VFM 27 assembly having a VFM driver input linked to a VFM mirror (not shown) and a D/A converter 39 linked to sine-wave RAM 38 and to the VFM driver input of VFM assembly 27. Finally, raster-based display means 4 further preferably includes display control means (not shown) linked to all of the above.

The method of the subject invention includes an initializing step, a compressing step, a selecting step, a modifying step, a transforming step, a forming step, a displaying step, a filing step, and an interacting step.

Figure 6:
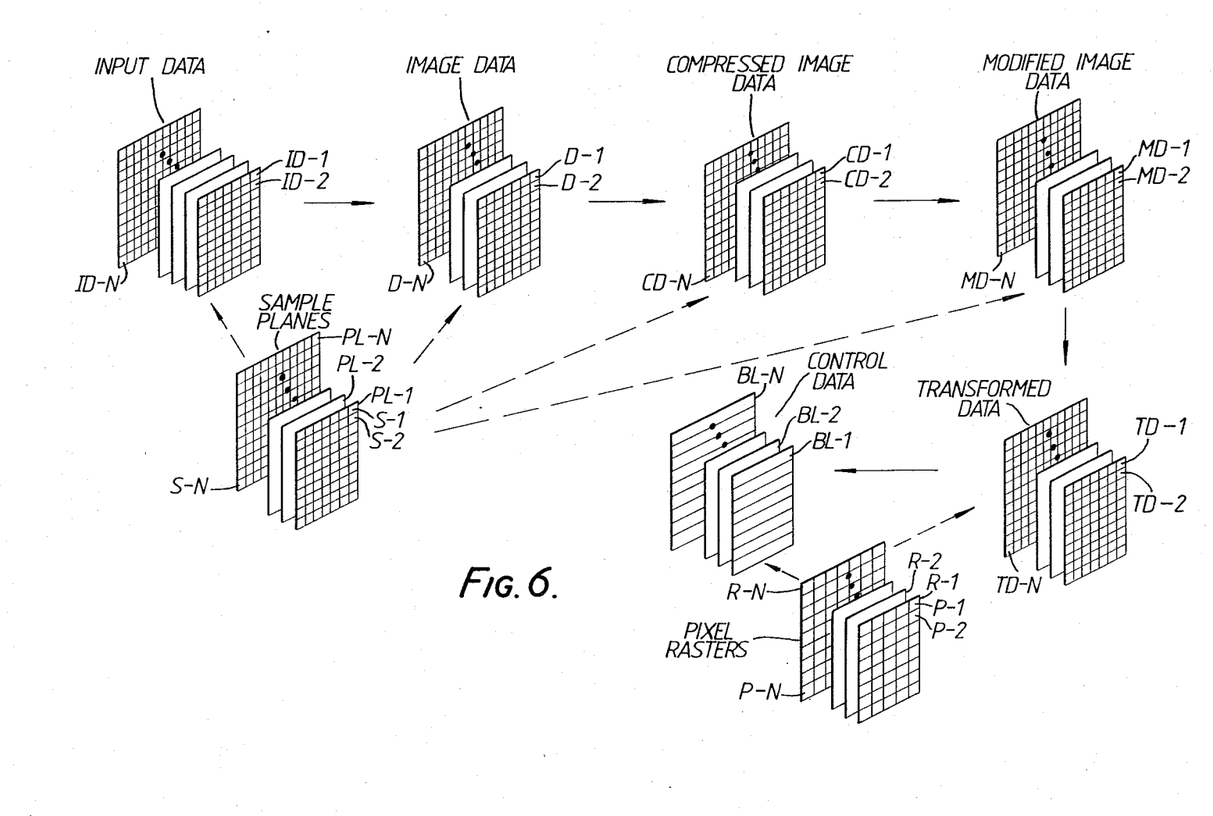
FIG. 6 illustrates the interrelationships of the various data of the system of the subject invention.

With reference to FIG. 6, in the initializing step, input data ID-1, ID-2 ... ID-N representative of a plurality of planes PL-1, PL-2 ... PL-N of samples S-1, S-2 ... S-N of an attribute of an object are formatted to obtain image data D-1, D-2 ... D-N also representative of sample planes PL-1, PL-2 ... PL-N.

Figure 7A:
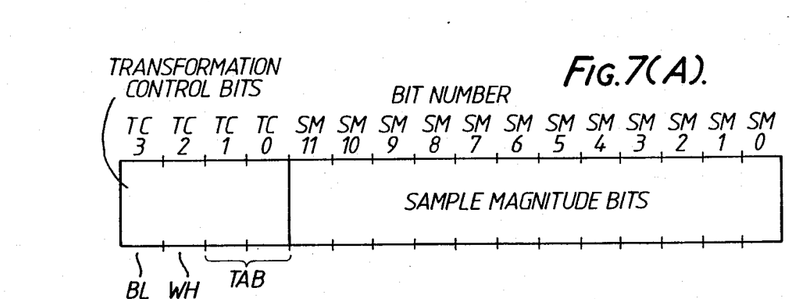
FIG. 7(A) illustrates the format of an image datum.

An image datum, as shown in FIG. 7(A), corresponds to a location within the object, and is comprised of sample magnitude bits SM0-SM11 representing a value equal to the sample of the attribute of the object at that location. Also with reference to FIG. 7(A), each image datum is further comprised of transformation control bits TC0-TC3 having a value to be set in response to user commands in the subsequent modifying step.

Also in the initializing step, a plurality of look-up tables ("LUTs"), each having a corresponding windowing function, is set up for use in the subsequent transforming step.

In the compressing step, the image data is compressed to obtain compressed image data CD-1, CD-2 ... CD-N also representative of the sample planes wherein each compressed datum is comprised of sample magnitude bits and brightness magnitude bits. The image data is preferably compressed to obtain singly compressed image data and doubly compressed image data. For example, the image data preferably represents up to 60 planes of 512×512 samples, and is preferably compressed to obtain singly compressed image data representative of up to 60 planes of 256×256 samples, and doubly compressed image data representative of up to 60 planes of 128×128 samples.

In the selecting step, either the singly or doubly compressed data is selected in response to user commands to obtain selected image data for use in subsequent steps of the subject invention. Preferably, the doubly compressed data is initially selected, and then modified, transformed, and displayed in subsequent steps of the subject invention. Thereafter, in response to a "zooming-in" and "pan" commands from the user, the system retrieves a portion of the singly compressed data for use in subsequent steps of the subject invention. The selected portion corresponds to a high resolution representation of a corresponding portion of the doubly compressed data such that the resultant display shows an increased level of detail.

In the modifying step, the transformation control bits of the selected image data are preferably modified in response to user commands to obtain modified image data MD-1, MD-2 ... MD-N also representative of the sample planes. The transformation control bits are modified to direct the transforming of the sample magnitude bits of the selected image datum in the subsequent transforming step. The transformation control bits are modified to enable a user to blank portions of an image, to display cursors of various shapes within the image, or to highlight certain structures within the image, e.g. bone.

Figure 7B:
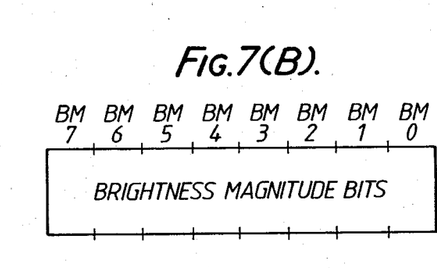
FIG. 7(B) illustrates the format of a transformed datum.

In the transforming step, the modified image data is transformed to obtain transformed data TD-1, TD-2 ... TD-N representative of a plurality of rasters R-1, R-2 ... R-N of pixels P-1, P-2 ... P-N. With reference to FIG. 7(B), each transformed datum is comprised of brightness magnitude bits BM0-BM7 having a value determined by the transformation control bits, and in some cases the sample magnitude bits, of the modified image datum corresponding to the transformed datum.

For example, with reference to FIG. 7(A), if transformation control bit TC3 ("the BL bit") is set to "1", then the brightness magnitude value of the corresponding modified image datum is set to the minimum brightness value, i.e. "000000", in the transforming step. If transformation control bit TC2 ("the WH bit") is set to "1", then the brightness magnitude value of the corresponding modified image datum is set to the maximum brightness value, i.e. "11111111", in the transforming step. If transformation control bits TC3 and TC2 are set to "0", and transformation control bits TC1 and TC0 ("the TAB bits") are set to "00", "01", "10", or "11", the brightness magnitude value of the corresponding modified image datum is set in accordance with first, second, third, or fourth windowing functions corresponding to first, second, third, or fourth look-up tables ("LUTs") set up in the previous initializing step.

Figure 8:
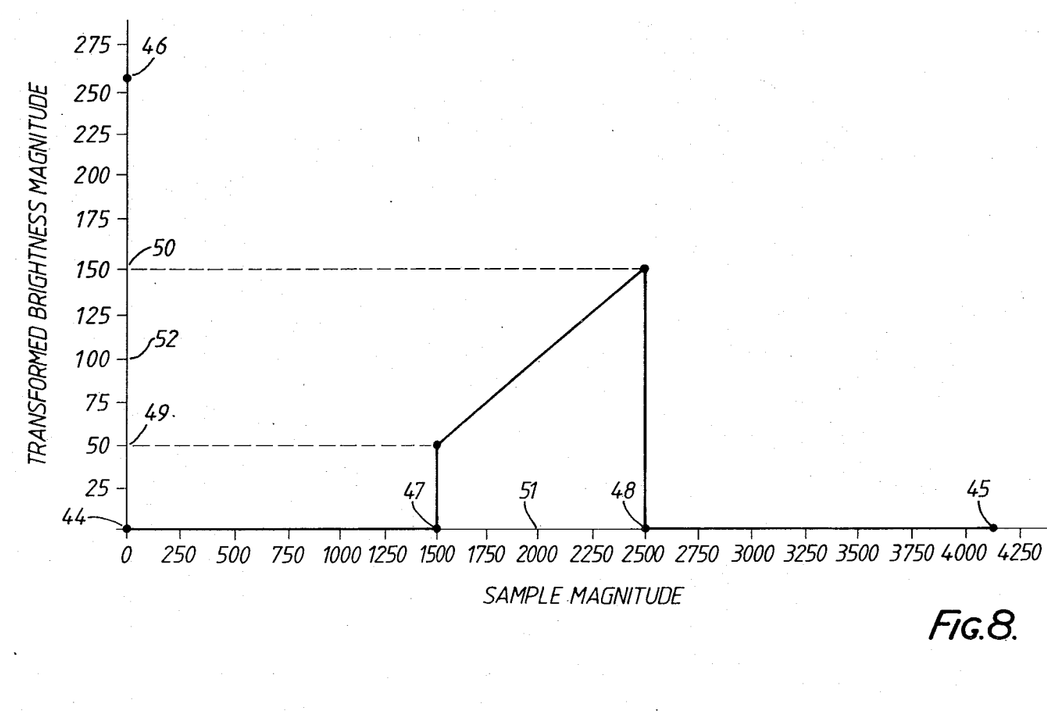
FIG. 8 illustrates a windowing function corresponding to a look-up table ("LUT")

The brightness magnitude value is set in such cases by applying the windowing function corresponding to the value of the transformation control bits of a modified image datum to the sample magnitude value of that datum. Such a function is depicted in FIG. 8, which shows all possible sample magnitude values along a horizontal axis, and all possible brightness magnitude values along a vertical axis. Each possible sample magnitude value has a corresponding brightness value as determined by the function.

The sample magnitude values preferably range from 0 (denoted by reference character 44) to 4,095 (denoted by reference character 45). The brightness magnitude values range from 0 (reference character 44) to 255 (denoted by reference character 46).

The function transforms certain sample magnitude values to the minimum brightness magnitude value, i.e., "00000000," and transforms all other sample magnitude values to a brightness magnitude value linearly dependent on the sample magnitude value. For example, the exemplary function of FIG. 8 transforms sample magnitude values falling between 1,500 (denoted by reference character 47) and 2,500 (denoted by reference character 48) to linearly dependent brightness magnitude values falling between 50 (denoted by reference character 49) and 150 (denoted by reference character 50).

The range of such sample magnitude values is defined as the "width" of the windowing function, and the range of the corresponding brightness magnitude values is defined as the "contrast" of the function. Furthermore, the midpoint of the range of such sample magnitude values is defined as the "level" of the function, and the midpoint of the range of the corresponding brightness magnitude values is defined as the "brightness" of the function.

For the exemplary function of FIG. 8, the width is 1,000, and the contrast is 100. Furthermore, the level, denoted by reference character 51, is 2,000, and the brightness, denoted by reference character 52, is 100.

Such transforming enables a user to highlight a certain structure within an image, e.g. bone, while suppressing the rest of the image, and is made possible by setting up a LUT in the initializing step having a corresponding windowing function with a width encompassing the range of sample magnitude values of the samples of the structure.

The BL bit of a modified image datum is set to "1" in the modifying step, and the resultant transformed datum is set to the minimum brightness value in the subsequent transforming step for a different purpose: to suppress the displaying of such datum in the subsequent displaying step. The displaying of such datum is suppressed in order to enable a user to peel or slice away selected portions of the resultant three-dimensional image and to observe the underlying portions of the image previously partially obscured by the peeled-away portion.

The WH bit of a modified image datum is set to "1" in the modifying step, and the resultant transformed datum is set to the maximum brightness value in the subsequent transforming step for a different purpose: to highlight a portion of the resultant image corresponding to a cursor having a variety of shapes, e.g. crosshair, box, or plane.

In the forming step, with reference to FIG. 6, blocks of control data BL-1, BL-2 . . . BL-N are formed for each raster R-1, R-2 . . . R-N of pixels P-1, P-2 . . . P-N represented by the transformed data comprised of control data necessary for raster-based display means 4 to properly display the transformed data representative of the corresponding pixel raster.

In the displaying step, the transformed data is displayed to produce a three-dimensional image. The data is displayed one raster at a time in accordance with the corresponding block of control data, to produce a time series of two dimensional images on the system CRT 26. The CRT is suspended face down over the VFM. The viewer sees the reflected image of the CRT face in the mirror. A three-dimensional image is formed as the VFM mirror converts the rapid time sequence of two-dimensional images into a series of mutually displaced two-dimensional images which form the three-dimensional image.

In the storing or filing step, the transformed data is stored in the memory 15 as a file of transformed data. Similarly, the corresponding blocks of control data are filled to obtain a file of corresponding control blocks.

In the interacting step, additional user commands are received, decoded, and responded to by the system to produce a plurality of files of transformed data and a plurality of corresponding files of control blocks after additional invocations of the aforementioned steps.

Thereafter, in subsequent invocations of the displaying step, and in response to a user command one of such files of transformed data is selected and displayed in accordance with the corresponding file of control blocks.

To implement the initializing step in the system of the subject invention, host processor 10 is preferably programmed to control the memory processor 9 to receive input data from data input means 6 and to store the data in block memory 15 and ultimately cache memory 20, and to control the high-speed processor 2 to format the data. Data input means 6 is preferably any commercial CAT-SCAN ("CT"), Position Emission Tomography (PET), Single Photon Emission Computed (SPECT), Magnetic Resonance Imagining (MRI), or Ultrasound B-scanner.

High-speed processing means 2 is preferably programmed to format the input data to obtain image data representative of a plurality of equally-spaced two-dimensional planes of samples of an attribute of an object, e.g., density. The format of the data is preferably illustrated by FIG. 6, and the format of each datum is preferably illustrated by FIG. 7(A).

With reference to FIG. 7(A), each formatted datum is comprised of 16 bits, wherein bits zero through 11 are sample magnitude bits having a value ranging from zero to 4,095, and wherein bits 12 through 15 are transformation control bits.

Host processor 10 is also preferably programmed to set up a plurality of look-up tables ("LUTs") in the scratch-pad memories ("SPADs") of high-speed processor 2. Each LUT corresponds to a windowing function for transforming the sample magnitude value of a 12-bit image datum to obtain a brightness magnitude value of an 8-bit transformed datum.

The width, level, contrast, and brightness values of a windowing function and corresponding LUT are sufficient to completely describe the function and corresponding LUT. Host processor 10 is preferably programmed to receive such values from user input means 5 for a plurality of windowing functions and corresponding LUTs, to transfer the values to high-speed processing means 2, and to signal high-speed processing means 2 to set up the corresponding LUTS in SPADS 17.

A total of 16 LUTS are preferably set up in the initializing step corresponding to transformation control bits TC3–TC0 having a value from 0 to 15. Four LUTs are preferably set up corresponding to transformation control bit values of 0 to 3, or TAB bits values of "00", "01", "10", and "11" respectively. These tables are set up in accordance with user commands as described above. Four LUTs are preferably set up corresponding to transformation control bit values of 4 to 7, or a WH value of "1". These tables are set up so that all sample magnitude values are transformed to the maximum brightness magnitude value of "11111111." Eight LUTs are preferably set up corresponding to transformation control bit values of 8 to 15, or a BL bit value of "1". These tables are set up so that all sample magnitude values are transformed to the minimum brightness magnitude value of "00000000." As a result of the above, the transformation of simple magnitude values is entirely implemented through the use of LUTs regardless of whether the transformation is in accordance with a BL bit value of "1", a WH bit value of "1", or TAB bit values of "00", "01", "10", or "11".

The image data is preferably representative of up to 60 two-dimensional planes of 512×512 samples. To implement the compressing step of the subject invention, high-speed processing means 2 is preferably programmed to compress the image data at various degrees to obtain singly compressed data preferably representative of up to 60 planes of 256×256 samples, and doubly compressed data preferably representative of up to 60 planes of 128×128 samples.

High-speed processing means 2 is preferably programmed to transfer the image data, the singly-compressed data, and the doubly-compressed data into cache memory 20 from block memory 15, and to control the memory processor 9 in transferring the data to and from block memory 15.

To implement the selecting step, host processor 10 is preferably programmed to receive a user command and thereby select either the singly or doubly compressed data for modification in the subsequent modifying step to obtain selected data. In the first invocation of the selecting step, the doubly compressed data is preferably selected.

To implement the modifying step in the system of the subject invention, host processor 10 is preferably programmed to receive user commands from user input means 5, to control memory processor 9 in transferring the selected data to cache memory 20 in response to such commands, and to control high-speed processor 2 in setting the values of the transformation control bits of selected datum in accordance with the received commands.

With reference to FIG. 6, high-speed processor 2 is preferably programmed to set transformation control bit BL to "1" and thereby transform the sample magnitude value of the datum to "00000000" in the subsequent transforming step (for blanking), or alternatively set transformation control bit WH to "1" and thereby transform the sample magnitude value of the datum to "11111111" in the subsequent transforming step (for highlighting), or to alternatively set transformation control bits TAB to "00", "01", "10", or "11" and thereby transform the sample magnitude value according to first, second, third, or fourth LUTs stored in SPADs 7 of high-speed processing means 2 in the subsequent transforming step.

To implement the transforming step in the system of the subject invention, host processor 10 is preferably programmed to signal high-speed processor 2 to transform the 12-bit sample magnitude value of each selected datum as described above to obtain an 8-bit brightness magnitude value of a transformed datum, to store the transformed datum in cache memory 20, and to control the memory processor 9 in transferring the transformed datum to block memory 15 from cache memory 20.

To implement the forming step host processor 10 is preferably programmed to form a block of control data for each pixel raster represented by the transformed data comprised of address data indicative of the location in block memory 15 where the transformed data representative of the raster is stored, synchronization data indicative of the appropriate pixel interval to begin displaying the transformed data, and initial and incremental values of horizontal and vertical deflection data indicative of the size of the resultant two-dimensional image displayed on the face of the CRT.

Figure 9:
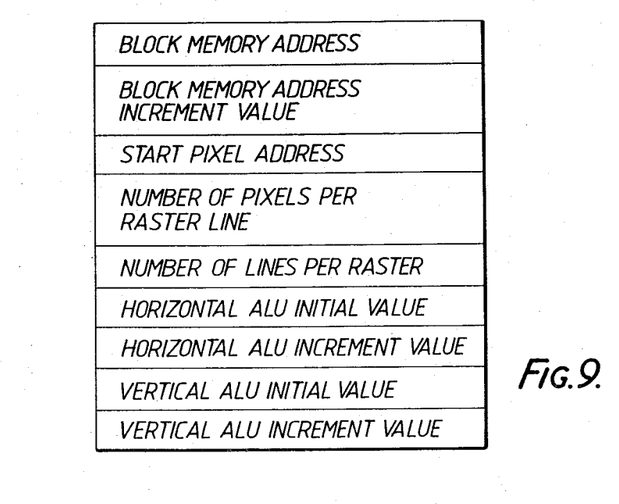
FIG. 9 illustrates the format of a control block.

More specifically, with respect to FIG. 9, a control block preferably comprises a block memory address, a block memory address increment, a start pixel address, the number of pixels per line of a raster, the number of lines per raster, a horizontal arithmetic logic unit ("ALU") initial value, a horizontal ALU increment value, a vertical ALU initial value, and a vertical ALU increment value.

The block memory address is the address in block memory of the transformed data representative of the corresponding raster, and the block memory address increment is the value which is successively added to the block memory address to retrieve successive transformed datum representative of the raster. Host processor 10 is preferably programmed to compute the block memory address and the block memory address increment differently depending on whether the data representative of the corresponding raster is to be displayed while the VFM mirror is receding from or moving towards the CRT. If the transformed data representative of the raster is to be displayed while the VFM mirror of the VFM assembly is receding from the CRT, the block memory address is the address in block memory of the first transformed datum representative of the raster, and the block memory address increment value is "+1". If the transferred data is to be displayed while the VFM mirror is moving towards the CRT, the block memory address is the address in block memory of the last transformed datum representative of the raster, and the block memory address increment value is "−1." The host processor is preferably programmed in this way so that, as described in more detail in Harris, et al., all the resulting two-dimensional images comprising the three-dimensional image are tilted the same way.

The start pixel address is indicative of the appropriate point in time within a display cycle to begin displaying the transformed data representative of the corresponding raster, and is preferably expressed as a pixel interval within a display cycle. The display cycle represents the time for VFM mirror of the VFM assembly to traverse an entire cycle of movement. The VFM mirror preferably traverses such a cycle at a frequency of 30 Hz. resulting in a display cycle of 33.33 msec.

The display cycle is also the time required to display all the transformed data representative of all the pixel rasters. Each datum is displayed in a time interval known as a pixel interval preferably equal to 33.33 nsec. The display cycle is preferably expressed in terms of pixel intervals, and is preferably equal to 1,048,576 pixel intervals. As a result, the start pixel address preferably ranges in value from zero to 1,048,576.

Host processor 10 is preferably programmed to compute start pixel addresses of successive control blocks corresponding to successive rasters to assure that the resultant two-dimensional images are equidistant. Such a computation takes account of the nonlinear movement of the VFM mirror, and is described in more detail in Harris, et al.

The number of pixels per line is preferably 128, and the number of lines per raster is also preferably 128.

The horizontal ALU initial value, the horizontal ALU increment value, the vertical ALU initial value, and the vertical ALU increment value are determinative of the size of the resultant two-dimensional image on the face of the CRT produced by displaying the data of the corresponding raster. Host processor 10 is preferably programmed to compute such values to correct for anomalous perspective as described in Harris et al.

The displaying step is preferably implemented in the system of the subject invention by programming host processor 10 to transfer the control blocks to raster-based display means 4, to initialize each of the pixel counter range register 40, the sine-wave clock divisor register 41, and the sine-wave offset register 42, and to control raster-based display means 4 to display the transformed data in accordance with the corresponding control blocks.

Host processor 10 is preferably programmed to initialize pixel counter range register 40 with the number of pixel intervals within a display cycle, preferably 1,048,576.

Host processor 10 is also preferably programmed to initialize sine-wave clock divisor register 41 with a value determinative of the rate at which VFM driver datum is generated to drive the VFM mirror of VFM assembly 27. The value is preferably expressed as the number of pixel intervals equal to the inverse of the rate at which the driver datum is generated, preferably 500.

Finally, host processor 10 is preferably programmed to initialize sine-wave offset register 42 with a value determinative of the start of the cycle of VFM mirror movement relative to the start of the display cycle. The value represents the number of pixel intervals which transpire from the start of the display cycle before the first VFM driver datum is generated.

The displaying step is further preferably implemented by programming the display control means of raster-based display means 4 to receive the corresponding blocks of control data, and to store the blocks in sweep control SPAD 22. For each control block, the display control means is further preferably programmed to transfer the block memory address and the block memory address increment value of the block from SPAD 22 to address FIFO buffer 24, to control memory processor 9 in transferring the transformed data representative of the corresponding raster stored at the locations in block memory 15 indicated by the block memory address and increment value to data FIFO buffer 25, and to display the transformed data representative of the raster once per display cycle beginning at the pixel interval specified by the start pixel address in the control block.

The display of the data is preferably controlled by clock generator 43 which increments pixel counter 35 every pixel interval and which resets pixel counter 35 when the value of the data stored in the counter exceeds the number of pixel intervals comprising a display cycle stored in pixel counter range register 40.

The movement of the VFM mirror of VFM assembly 27 is preferably simultaneously controlled by clock generator 43 which increments the address counter 37 at the rate determined by the value stored in sine-wave clock divisor register 41, and which resets address counter 37 at the same time that pixel counter 35 is reset.

The display of the data is further preferably controlled by the display control means which is further preferably programmed to transfer the start pixel address from SPAD 22 to pixel register 29. The value stored in pixel register 29 is compared with the value stored in the pixel counter 35 by means of comparator 36. When the two values are equal, horizontal sweep ALU 30 and vertical sweep ALU 31 are initiated.

The horizontal and vertical sweep ALUs, when enabled, preferably generate horizontal and vertical deflection datum. The ALUs are preferably initialized by the display control means with the horizontal and vertical ALU initial values, and thereafter respectively incremented by the horizontal and vertical ALU increment values. Horizontal sweep ALU 30 is preferably incremented every pixel interval, and reset to "0" when the value of the deflection datum stored in the ALU exceeds the number of pixels per line, preferably 128. Vertical sweep ALU 31 is preferably incremented at the same time horizontal sweep ALU 30 is reset to "0", and is reset when the value of the deflection datum stored in the ALU exceeds the number of lines per raster, preferably 128. When vertical sweep ALU 31 is reset, both ALUs are preferably disabled until enabled later on in preparation for the display of data of the next raster.

To display a datum, the value of the datum is preferably converted to an analog signal by D/A converter 28 and input to the brightness input of CRT 26. Simultaneously, the values of the corresponding horizontal and vertical deflection datum are preferably converted to analog signals by D/A converters 32 and 33, respectively, and input to the horizontal and vertical deflection inputs, respectively, of CRT 26.

The display control means is also preferably programmed to add the value stored in address counter 37 to the value stored in sine wave offset register 42 to form an address, and to retrieve a VFM driver datum from sine wave RAM 38 stored at that address. The value is preferably converted to an analog signal by D/A converter 39 and input to the VFM driver input of VFM assembly 27.

The file forming and storing step of the subject invention is implemented by programming host processor 10 to form a file comprised of the transformed data, to form a file of the corresponding control blocks, and to control memory processor 9 in storing the files in block memory 15, or data disk 45.

The interactive control step of the subject invention is implemented by preferably programming host processor 10 to receive user commands from user input means 5, decode such commands, and cause additional invocations of the aforementioned steps to occur.

For example, host processor 10 is preferably programmed to enter zoom-in mode in response to a user command whereby host processor 10 is programmed to select any 128×128×30 pixel subregion of the 256×256×up to 60 pixel three-dimensional image. Host processor 10 is also preferably programmed, in response to a user command, to control memory processor 9 in transferring the singly compressed data to cache memory 20, to control high-speed processing means 2 in selecting singly-compressed data corresponding to the selected subregion of the image in transforming the selected data in accordance with the LUTs stored in SPADs 17, and in storing the transformed data file in cache memory 20, to control memory processor 9 in transferring the data to block memory 15, to form control blocks corresponding to the transformed data and transfer the control blocks to raster-based display means 4, and to control raster-based display means 4 to display the data in accordance with the control blocks.

Host processor 10 is also preferably programmed to pan into and out of a three-dimensional image in response to a user command. To pan into or out of an image, host processor 10 is programmed to reshuffle the control blocks corresponding to the transformed data used to generate the image. The control blocks are reshuffled to change the sequence in which the rasters of transformed data are presented to the display controller for display to provide the visual impression of movement toward or away from the object.

To pan into the image, host processor 10 preferably reshuffles the control blocks to increase the index of the first raster to be so presented. To pan out of the image, host processor 10 preferably reshuffles the control blocks to decrease the index of the first raster to be so presented. Host processor 10 is programmed to then transfer the reshuffled control blocks to raster-based display means 4, and to control raster-based display means 4 in displaying the transformed data in accordance with the reshuffled control blocks.

Host processor 10 is also preferably programmed to display selected ones of a plurality of differently-shaped cursors at desired locations and positions within an image in response to user commands. To display a cursor at a particular location and position with an image, host processor 10 is preferably programmed to control high-speed processing means 2 in setting the WH bits of selected datum having the shape of the cursor in a location and position with the selected data corresponding to the desired location and position of the cursor within the image, then causing subsequent invocations of the transforming, forming, displaying, and storing and file forming steps to take place.

For example, to display a crosshair cursor at a particular location within an image, high-speed processing means 2 is programmed to set to "1" the WH bits of selected datum at corresponding locations within the selected data so as to display the shape of a crosshair.

To display a plane cursor at a particular location and position within an image, high-speed processing means 2 is preferably programmed to set the WH bits of a grid of every eighth selected datum located on a plane at a corresponding location and position within the selected data to "1".

Host processor 10 is also preferably programmed to extract the transformed data encompassed by the plane cursor, to control memory processor 9 in transferring the extracted data to two-dimensional viewer 44 in FIG. 4 and to control the two-dimensional viewer in displaying the extracted data.

Host processor 10 is also preferably programmed to suppress the displaying of certain transformed datum and thereby shave away selected portions of the resultant image in response to user commands. To suppress the display of such datum, host processor 10 is programmed to control high-speed processing means 2 in setting the BL bits of the datum to be suppressed to "1" and causing invocations of the transforming, forming, displaying, and file forming and storing steps to take place.

Host processor 10 is also preferably programmed to retain a plurality of transformed data files in block memory 15, and the display control means is preferably programmed to retain the corresponding blocks of control data in SPAD 22. Host processor 10 is further preferably programmed to subsequently select one of the plurality of files of transformed data in response to, and in accordance with, user commands, and to control raster-based display means 4 in displaying the transformed data of the file in accordance with the corresponding control blocks.

Additional advantages and modifications will readily occur to those skilled in the art. The invention in its broader aspects is not, therefore, limited to the specific details, representative methods, and illustrative examples shown and described. Accordingly, departures may be made from such details without departing from the spirit or scope of applicant's general inventive concept.

What is claimed is:

1. A system for selectively, interactively modifying and transforming image data of an object in response to user commands to generate transformed data from selected high-quality three-dimensional images of the object to be displayed on a display comprising:

user input means for inputting the user commands;

memory means for storing a plurality of arrays of image data, each of said image data arrays corresponding to a different plane of sample data associated with an attribute of the object;

high-speed processing means coupled to said memory means for selectively transforming said arrays of image data to produce corresponding arrays of transformed data and for storing said arrays of transformed data in said memory means;

a raster-based display means coupled to said memory means; and control means coupled to said user input means, said memory means, said high-speed processing means, and said raster-based display means, for receiving and decoding the user commands from said input means and, in response to the decoded user commands, for controlling (1) said high-speed processing means to access selected image data arrays stored in said memory means, to modify said accessed image data arrays to produce corresponding modified image data arrays, and to transform said modified image data arrays to produce said transformed data arrays which correspond to the selected high-quality three-dimensional images of the object, and to store said transformed data arrays in said memory means, wherein each of said transformed data arrays stored in said memory means comprises a corresponding file including a plurality of transformed image datum to be displayed by said raster-based display means within an interval of time corresponding to a display cycle, each of said transformed image datum in a file being displayable by said raster-based display means within an interval of time corresponding to a pixel interval, and wherein each of said image datum comprises transformation control bits and sample magnitude bits, and wherein said control means further includes means for controlling said high-speed processing means to modify the values of said transformation control bits of said image datum in response to the received user commands to obtain a modified image datum, and wherein said high-speed processing means further includes means for transforming the values of said sample magnitude bits of said modified image datum under the control of said control means in accordance with the values of the transformation control bits of said modified image datum to obtain a corresponding transformed datum and (2) said raster-based display means to display said transformed data arrays stored in said memory means to display the selected high-quality three-dimensional images of the object.

2. A system according to claim 1, wherein said high-speed processing means includes a cache memory coupled to said memory means and to said control means, and a high-speed processor coupled to said control means and to said cache memory, wherein said control means includes means (1) for controlling the transfer of said image data arrays from said memory means to said cache memory, and (2) for controlling said high-speed processor to modify said image data arrays transferred to said cache memory to obtain said modified image data arrays to transform said modified image data arrays to obtain said transformed data arrays, and to transfer said transformed data arrays from said cache memory to said memory means.

3. A system of claim 2, wherein said control means further includes means for controlling the transfer of said transformed data arrays to said raster-based display means for display thereby.

4. A method for processing a plurality of two-dimensional arrays of input data wherein each array of input data corresponds to a plane of sample data in an object and each corresponds to the value of an attribute of the object at a particular location therein, the method for producing and displaying high-quality three-dimensional images of the object, and for interactively modifying and transforming the data to produce and display resultant transformed images in response to user commands comprising the steps of:

(a) initializing the system comprising the substeps of receiving the arrays of input data representing the two-dimensional planes of samples of an attribute of the object;

formatting the received arrays of input data to obtain image data arrays representative of the plurality of sample planes, each of said image data arrays including a plurality of image datum, each of said image datum corresponding to a different location within the object and including sample magnitude bits having a value determined by the sample of the attribute of the object at said corresponding location, and transformation control bits, and setting up look-up tables in accordance with the user commands;

(b) compressing each of said image data arrays at different degrees of compression to obtain a singly compressed data array and a doubly compressed data associated with each of said image data arrays;

(c) selecting detail level arrays comprising selected ones of said singly compressed data arrays or said double compressed data arrays in response to a user command to display selected corresponding image data arrays;

(d) modifying the values of the transformation control bits of said selected detail level arrays in response to, and in accordance with, said user commands to obtain modified image data arrays, each of said modified image data arrays comprising a plurality of modified image datum;

(e) transforming said modified image data arrays to obtain corresponding transformed data arrays, each of said transformed data arrays including a two-dimensional raster of pixel values, said step of transforming including the substeps of selecting for each modified image datum a look-up table and transforming the value of each of said modified image datum according to said selected look-up table to obtain a corresponding transformed image datum having a brightness magnitude value;

(f) forming a block of control data corresponding to a different one of each of said transformed data arrays wherein each of said control blocks comprises address data necessary to locate the transformed image data array representative of a corresponding raster, synchronization data indicative of a pixel display interval to begin displaying the transformed data representative of said corresponding raster, and deflection data necessary to correct for anomalous perspective in the display of said corresponding transformed image data array; and (g) displaying a selected transformed image data array according to said corresponding block of control data.

5. A system for selectively, interactively modifying and transforming image data of an object in response to user commands to generate transformed data from selected high-quality three-dimensional images of the object to be displayed on a display comprising:

user input means for inputting the user commands;

memory means for storing a plurality of arrays of image data, each of said image data arrays corresponding to a different plane of sample data associated with an attribute of the object;

high-speed processing means coupled to said memory means for selectively transforming said arrays of image data to produce corresponding arrays of transformed data and for storing said arrays of transformed data in said memory means;

a raster-based display means coupled to said memory means; and control means coupled to said user input means, said memory means, said high-speed processing means, and said raster-based display means, for receiving and decoding the user commands from said input means and, in response to the decoded user commands, for controlling (1) said high-speed processing means to access selected image data arrays stored in said memory means, to modify said accessed image data arrays to produce corresponding modified image data arrays, and to transform said modified image data arrays to produce said transformed data arrays which correspond to the selected high-quality three-dimensional images of the object, and to store said transformed data arrays in said memory means, and (2) said raster-based display means to display said transformed data arrays stored in said memory means to display the selected high-quality three-dimensional images of the object, wherein said high-speed processing means includes a cache memory coupled to said memory means and to said control means, and a high-speed processor coupled to said control means and to said cache memory, wherein said control means includes means (1) for controlling the transfer of said image data arrays from said memory means to said cache memory, and (2) for controlling said high-speed processor to modify said image data arrays transferred to said cache memory to obtain said modified image data arrays to transform said modified image data arrays to obtain said transformed data arrays, and to transfer said transformed data arrays from said cache memory to said memory means, and wherein said control means further includes means for controlling the transfer of said transformed data arrays to said raster-based display means for display thereby, and wherein said raster-based display means includes (1) a scratch-pad memory coupled to said control means, and (2) display control means coupled to said scratch-pad memory, said control means, and said memory means, and wherein said display control means includes means controlled by said control means for selectively retrieving said transformed data arrays stored in said memory means and for displaying said transformed data arrays in accordance with the user commands.

6. A system according to claim 5, wherein each of said transormed data arrays stored in said memory means comprises a corresponding file including a plurality of transformed image datum to be displayed by said raster-based display means within an interval of time corresponding to a display cycle, each of said transformed image datum in a file being displayable by said raster-based display means within an interval of time corresponding to a pixel interval.

7. A system according to claim 6, wherein each of said files corresponding to said transformed data arrays is stored in said memory means and represents an associated two-dimensional raster of display pixels, and wherein said control means further includes means for forming a different block of control data associated with each of said rasters comprising address data indicative of the locations in said memory means where the transformed data array representative of said associated raster is stored, synchronization data indicative of the pixel interval within the display cycle to begin displaying said transformed data array representative of said associated raster, and initial and increment values of horizontal and vertical deflection data for controlling said raster-based display means.

8. A system according to claim 7, wherein said raster-based display means further includes a CRT, and wherein said display control means further includes means for receiving a block of said control data from said control means, for retrieving the corresponding transformed data array stored at said locations in said memory means indicated by said address data of said control block, and for displaying said retrieved transformed data array beginning at the pixel interval within the display cycle indicated by the synchronization data of said control block to obtain a two-dimensional image on said CRT having a size determined by said horizontal and vertical deflection data.

9. A system according to claim 8, wherein said control means includes means for forming said plurality of files of transformed data in response to, and in accordance with, the received user commands, for storing said plurality of files in said memory means, for forming a plurality of files of associated control blocks of control data wherein each of said files of control blocks corresponds to a different one of said files of transformed image data and wherein each control block corresponds to a raster represented by the corresponding file of transformed data, for transferring said files of control blocks of control data to said raster-based display means, for selecting one of said files of transformed data in response to a user command, and for signalling said raster-based display means to display the transformed data included in said selected file in accordance with the corresponding file of control blocks.

10. A system according to claim 9, wherein said display control means further includes means for receiving said plurality of files of control blocks, for storing said received files in said scratch-pad memory, for choosing one of said files stored in said scratch-pad memory in response to said signal from said control means, for retrieving the corresponding file of transformed image data from said memory means, and for controlling said raster-based display means to display said retrieved data in accordance with said selected block of control data.

11. A system according to claim 10, wherein said control means further includes means for controlling said high-speed processing means to form a plurality of look-up tables in response to the received user commands, and wherein said high-speed processing means further includes a second scratch-pad memory coupled to said control means, to said cache memory, and to said high-speed processor for storing said look-up tables.

12. A system according to claim 11, wherein each of said image datum comprises transformation control bits and sample magnitude bits, and wherein said control means further includes means for controlling said high-speed processing means to modify the values of said transforming control bits of said image datum in response to the received user commands to obtain a modified image datum, and wherein said high-speed processor further includes means for transforming the values of said sample magnitude bits of said modified image datum under the control of said control means in accordance with the values of the transformation control bits of said modified image datum to obtain a corresponding transformed datum.

13. A system according to claim 12, wherein said high-speed processor further includes means for selecting one of said look-up tables according to the value of the transformation control bits of said modified image datum, and for setting the value of the sample magnitude bits of said modified image datum according to said selected look-up table to obtain a corresponding transformed datum.

* * * * *